Figure 1:
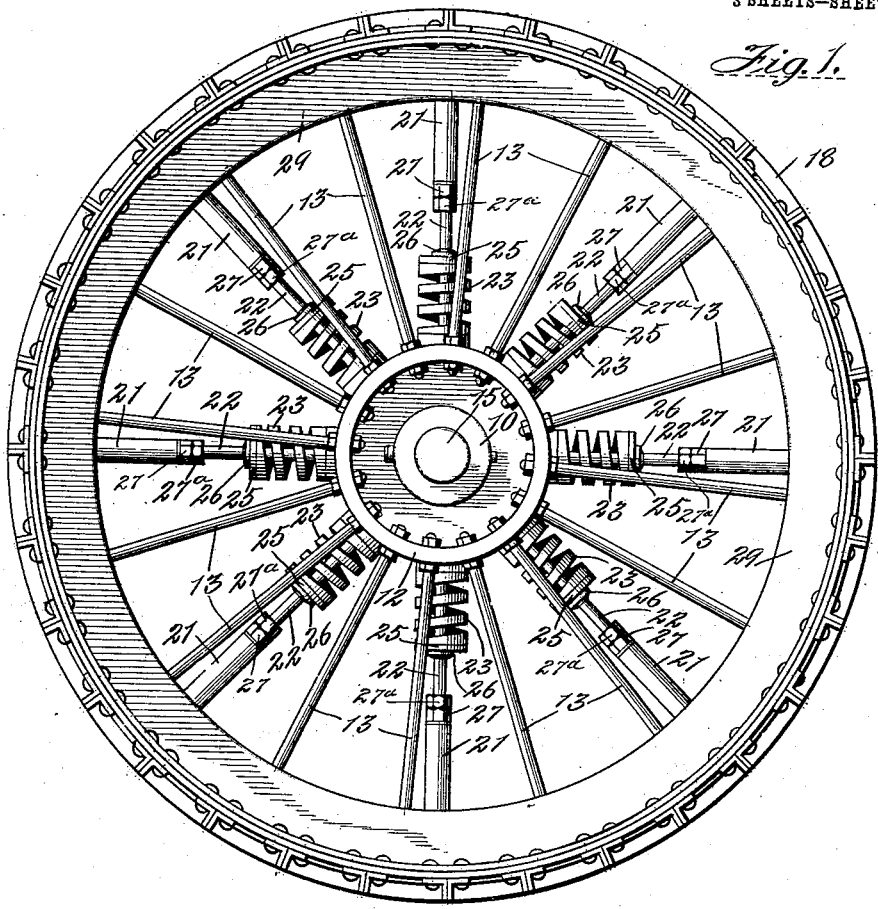

G. W. MORRIS.
VEHICLE WHEEL.
APPLICATION FILED JUNE 17, 1907.

917,884.

Patented Apr. 13, 1909.
3 SHEETS—SHEET 1.

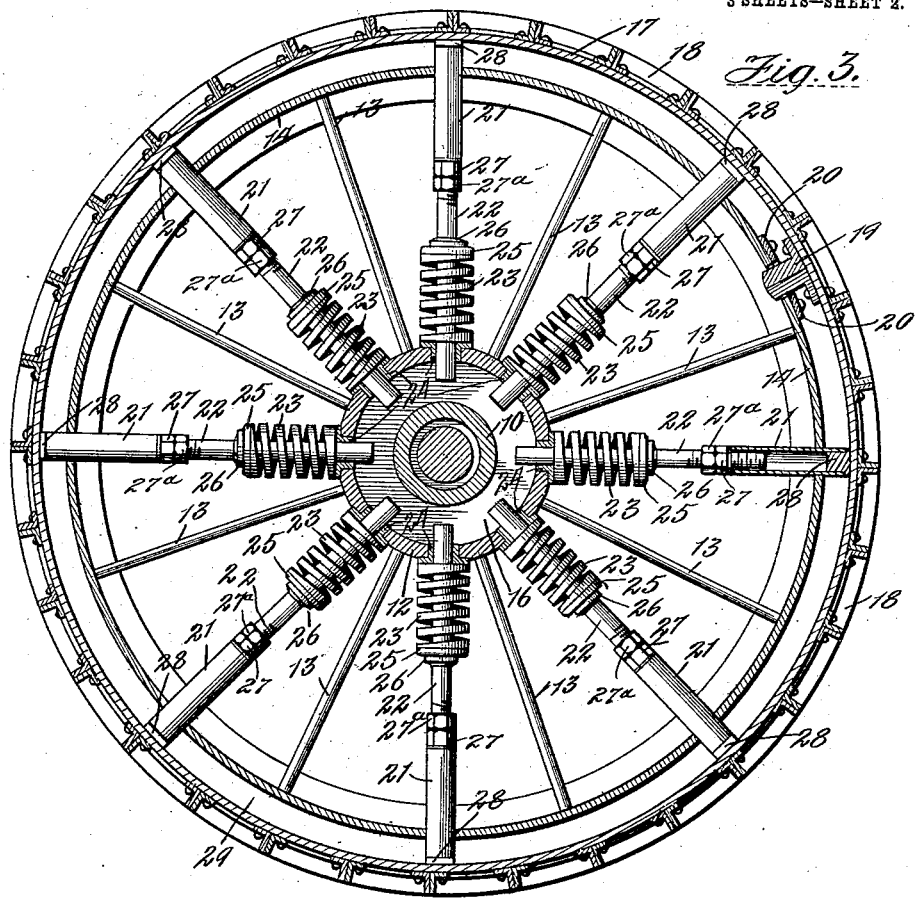

G. W. MORRIS.
VEHICLE WHEEL.
APPLICATION FILED JUNE 17, 1907.

917,884.

Patented Apr. 13, 1909.
3 SHEETS—SHEET 3.

Witnesses:
Inventor:
George W. Morris

UNITED STATES PATENT OFFICE.

GEORGE W. MORRIS, OF RACINE, WISCONSIN.

VEHICLE-WHEEL.

No. 917,884.     Specification of Letters Patent.     Patented April 13, 1909.

Application filed June 17, 1907. Serial No. 379,434.

*To all whom it may concern:*

Be it known that I, GEORGE W. MORRIS, a subject of the King of Great Britain, residing at Racine, county of Racine, State of Wisconsin, have invented certain new and useful Improvements in Vehicle-Wheels, of which the following is a specification, reference being had to the accompanying drawings.

This invention relates to wheels for use in connection with vehicles, and relates particularly to that class of wheels in which a series of radially-disposed coiled springs are employed to absorb the shocks to which the wheels are subjected in use.

The object of the invention is to produce a wheel of this class that shall be strong and durable and that will permit of the full amount of independent relative movement between the wheel proper and the independent rim which surrounds the same without breaking or distorting the resilient struts or any of the members thereof that act to support said outer rim in proper position with relation to the wheel proper. I accomplish this object by the means shown in the drawings and hereinafter specifically described.

That which I believe to be new will be set forth in the claims.

Figure 2:
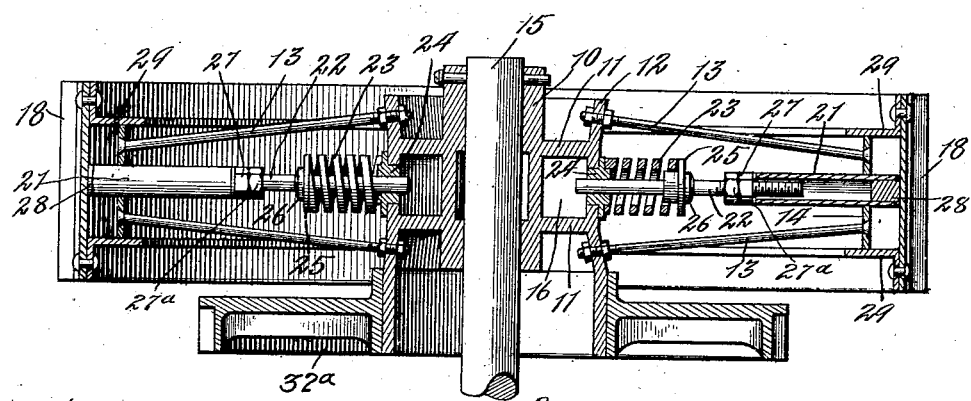
Figure 5:
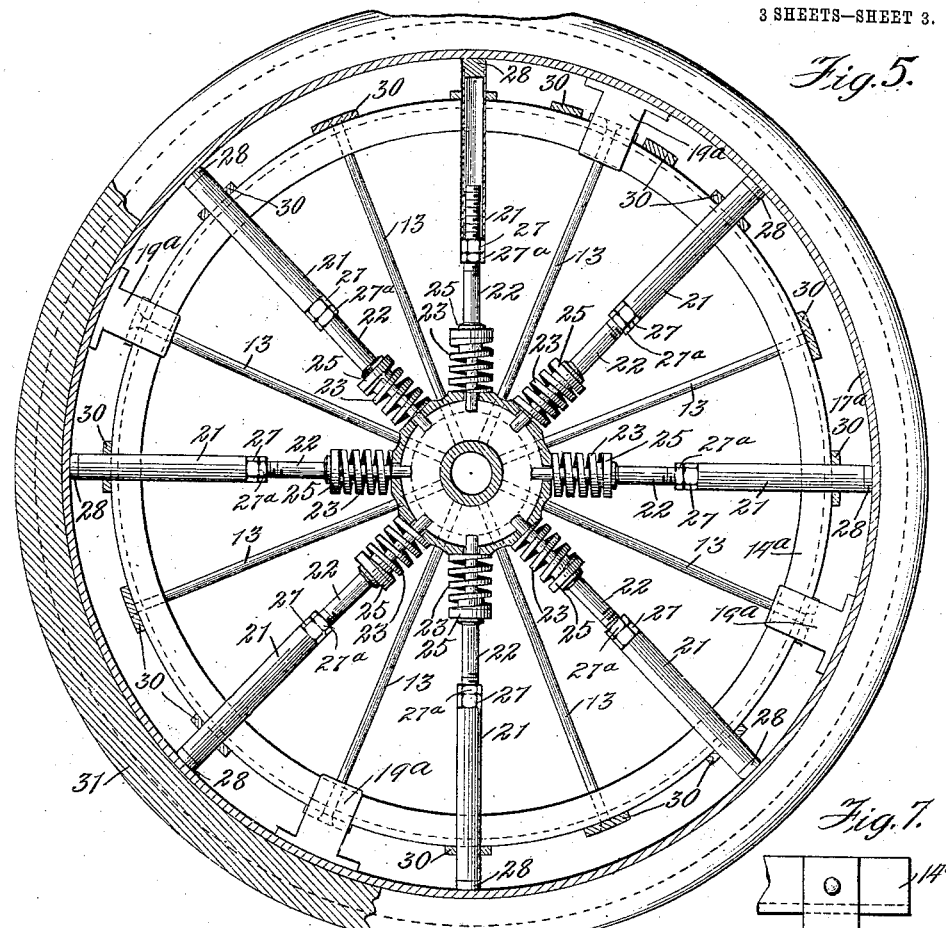
Figure 7:
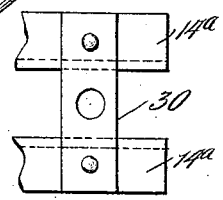
Figure 6:
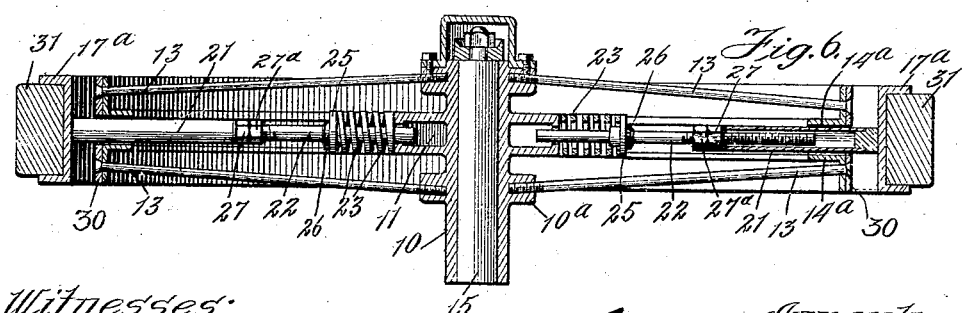

In the accompanying drawings:—Figure 1 is a side elevation of a wheel embodying my improvements, said wheel being of the type designed for use in connection with traction engines or other similar heavy vehicles. Fig. 2 is a horizontal section through the wheel of Fig. 1, and showing also in section a large gear on the hub of the wheel, which gear is adapted to be engaged by a driving gear. Fig. 3 is a vertical central section through the wheel. Fig. 4 is an enlarged detail, partly in section, of one of the struts employed between the hub of the wheel and the separate outer rim, two members of the strut being shown as broken away. Fig. 5 is a side view of a modified form of wheel, the view being partly in section and partly in elevation, and the wheel shown being one intended for a lighter use than the wheel of the preceding figures. Fig. 6 is a cross-section through the wheel of Fig. 5. Fig. 7 is a plan view of a portion of the wheel rim employed in the construction shown in Figs. 5 and 6, and showing also a cross strip through which one of the struts passes.

Referring to the several figures of the drawings, in which corresponding parts are indicated by like reference numerals, and particularly to the construction shown in Figs. 1 to 4, inclusive, 10 indicates the hub of the wheel, from the central portion of which extend out radially two flanges 11, spaced a distance apart, said flanges at their outer edges having laterally-extending wings 12 through which the inner ends of the wheel spokes 13 pass and are suitably secured either by nuts screwed upon their ends, as shown, or otherwise. The parts 10, 11 and 12, which constitute the hub, are preferably formed integral as indicated. In the formation of the hub, there will be left, as is shown, an annular space 16 between the radial flange 11 which is bridged over at the outer side by a wall through which openings are made at intervals in which are seated caps for the resilient struts hereinafter described. 14 indicates the rim of the wheel proper formed of a heavy annular band in which the outer ends of the wheel spokes 13 are suitably secured. 15 indicates an axle upon which the wheel is mounted. 17 indicates an outer rim formed of a heavy band, to the outer face of which, when the wheel is to be used for a traction engine or for other exceedingly heavy vehicles, there is suitably attached a series of diagonally-extending grouters or cleats 18, as usual. To the inner face of this outer rim 17 is suitably secured a stud 19 that at all times projects through an opening in the wheel rim 14 so that said outer rim and the wheel will be compelled to travel together. As shown, there is riveted across the outer face of the wheel rim 14 at each side of the hole through which this stud projects two short cross pieces 20 to afford bearings for the stud. The outer rim 17 is to be held at a suitable distance from the wheel rim 14 and for this purpose I provide a series of radially-extending struts, each of said struts, in the construction shown, comprising three principal members,—to-wit, a tubular section 21, a rod 22 fitting within the tubular member 21, and adjustably held therein, and a coiled spring member 23 mounted on said rod member 22. Each strut projects radially from the hub, there being provided at the inner end of each strut a cap 24 which is seated in a suitable opening in the wall over the annular space 16, which is adapted at its outer end to properly receive and support one end of the coiled spring member 23. At the outer end of said coiled spring member, there is provided another cap 25 suitably engaging the spring, which cap, in the construction shown, bears against an annular flange 26 formed on the rod member 22. Each rod member, as stated, at its outer end projects into the tubular member 21. This outer end of the member 22 is screw-threaded, as best shown in Fig. 4, and upon it is screwed a nut 27 which bears against the inner end of the tubular member 21, or against an interposed washer, as shown. There may also be used as shown a set-nut 27$^a$ against this nut 27 if desired. By screwing the nut 27, the spring may be compressed as desired. 28 indicates a head secured in any suitable manner in the outer end of the tubular member 21 of each strut, said head being curved to conform to the curvature of the outer rim 17, against the inner surface of which it at all times bears. The wheel rim 14, as stated, is provided, at intervals centrally between its side edges, with openings through which the several tubular members 21 of the struts project, said openings being of a size but little larger than the said tubular members so as to provide an easy working fit of said members within the openings, whereby, when required, said strut members 21 can freely move back and forth. 29 indicates two angle iron rings riveted to the inner face of the outer rim 17 and spaced a distance apart sufficiently to permit the wheel rim 14 to move freely up and down between the inturned flanges of said rings. These rings will prevent any sidewise movement relatively between the wheel proper and the outer rim.

When in use, and when traveling upon a fairly level roadway, there will be but little relative movement between the wheel and its outer rim, inasmuch as the struts are supposed to have been so adjusted as to properly compress the springs to compensate for the load to be carried by the wheel, and there will be, therefore, just sufficient relative vertical movement of the parts to insure the easy riding of the vehicle. When, however, the wheel passes over rough or uneven ground so that the wheel is subjected to jars or shocks, there will necessarily be a much wider range of movement between the wheel and its outer rim and there must also be a certain amount of movement in the direction of travel of the wheel between such wheel and its outer rim, and if the struts were confined at both ends, or if they were allowed but a limited amount of play at one end, such struts would be strained or broken, but, by leaving their outer ends wholly unattached and free to slide upon the inner surface of the outer rim, such liability to damage or breaking is entirely done away with. The outer ends of the struts are insured against any lateral strains as the wheel rim through which they pass is prevented from lateral movement by the angle iron rings 29, and, as the faces of the heads 28 are smooth and curved to conform to the curvature of the outer rim, there will be between them and the outer rim as much relative movement in the direction of travel of the wheel as will be required under any conditions of use.

The wheel just described is primarily designed for use in connection with a traction-engine, and I have therefore shown in Fig. 2 a large gear 32$^a$ which is adapted to mesh with the driving gear of the engine, such gear 32$^a$ being rigidly secured to the hub of the wheel in any suitable manner.

Turning now to the construction of wheel illustrated in Fig. 5, it will be seen that in so far as the principle and mode of construction described for the wheel shown in the preceding figures are concerned they are practically the same. There are differences, however, in details of construction which are made mainly for the purpose of making a lighter wheel the better to adapt it for use on lighter vehicles. In this modified form, substantially the same hub as in the other construction is shown, there being flanges at the end marked 10$^a$ in which the inner ends of the spokes are secured instead of having flanges that project laterally from the central radial flanges 11. Instead of making the rim of the wheel of a single heavy band, as in the former construction, I construct it of two angle iron rings 14$^a$ spaced sufficiently apart to permit the struts to pass between them. The outer ends of the wheel spokes pass through the outwardly - projecting flanges of these angle iron rings and into cross bars 30 that extend across and connect the two angle irons 14$^a$ together. Such of these cross bars 30 as come opposite the struts have a hole formed through them of a size to admit the passage of the tubular members of the struts and yet permit of an easy longitudinal movement of such struts. Two of the cross bars are also placed near together so as to form a proper sized opening through which can project a stud 19$^a$ that is secured to the inner face of the outer rim and which corresponds in function to the stud 19 in the other construction. The outer rim of the wheel in the modified form is indicated by 17$^a$ and corresponds to the rim 17 of the other construction, except that instead of being formed of a flat-faced band it is formed channel-shaped so as to receive on its outer face a yielding tire 31 of any desired construction. In this modified form of wheel, I have not shown the inner ends of the springs held by caps such as 24 inserted in openings in the hub, but have shown the face of the hub provided with flat surfaces against which the springs rest, the ends of the rod members of the struts projecting through openings in the hub into an annular space as in the other construction. The strut members are in other respects like the strut members already described, and therefore are indicated by the same reference numerals. In this construction, I do not employ the flanged rings secured to the inner face of the outer rim and projecting down alongside of the wheel rim for the purpose of holding the wheel rim and the outer rim together against lateral movement, but instead I employ a series of the studs 19ª which project down sufficiently between the angle iron rings of which the wheel rim is composed to insure against sidewise separation of the parts under any conditions. It is only necessary to employ one of these rings, however, in connection with two of the cross strips as a driving device. It will be understood that each one of these studs 19ª is of sufficient thickness to substantially fill the space between the angle iron rings that compose the wheel rim and yet not fit so tightly as to prevent a relative vertical movement between the parts.

What I claim as my invention and desire to secure by Letters Patent is:—

1. In a wheel, the combination with an inner and outer rim, means for connecting said rims so that they will move together, and a hub, of a series of resilient struts, each strut comprising a rod-member at the inner end of the strut, a coiled spring surrounding the rod-member, said spring bearing at its inner end against said hub and bearing at its other end against a projection on said rod-member, and a tubular member at the outer end of said strut, said tubular member passing through and being radially movable in said inner rim, and said rod-member passing into and being radially movable in said hub.

2. In a wheel, the combination with a hub provided with two radial flanges spaced a distance apart, an inner and an outer rim, and means for connecting the two rims so that they will move together, of a series of resilient struts radiating from said wheel hub, such struts passing through openings in said inner rim and longitudinally movable in said openings, the outer ends of said struts bearing against the inner surface of said outer rim, and each of the struts comprising a tubular member at the outer end, a rod-member at the inner end projecting at one of its ends into the tubular member and at its other end projecting between the said radial flanges on the hub, and a spring-member surrounding the rod-member and bearing at its inner end against said hub and at its outer end against a projection on said rod-member.

3. In a wheel, the combination with a hub provided with two radial flanges spaced a distance apart, an inner and an outer rim, and means for connecting said two rims so that they will move together, of a series of resilient struts radiating from said hub, said struts passing through openings in said inner rim and longitudinally movable in said openings, the outer ends of said struts bearing against the inner surface of said outer rim, and each of said struts comprising a tubular member at the outer end, a rod-member at the inner end projecting at one of its ends into the tubular member and at its other end projecting between said radial flanges on the hub, a coiled spring-member surrounding the rod-member and bearing at its inner end against the wheel hub and at its outer end against a projection on said rod-member, and a nut on said rod-member against which the inner end of said tubular member bears.

4. In a wheel, the combination with a hub, an inner and an outer rim, and means for connecting said two rims so that they will move together, of a series of resilient struts radiating from the said hub, said struts projecting through openings in said inner rim and longitudinally movable in said openings, and two angular rings secured to the inner face of said outer rim, said rings projecting inward beyond said inner rim to prevent sidewise movement relatively between said inner and outer rims.

GEORGE W. MORRIS.

Witnesses:
C. R. CARPENTER,
HARVEY FORD.